(No Model.)
O. B. ROWLETT.
DEVICE FOR PURIFYING AIR.
No. 283,724. Patented Aug. 21, 1883.
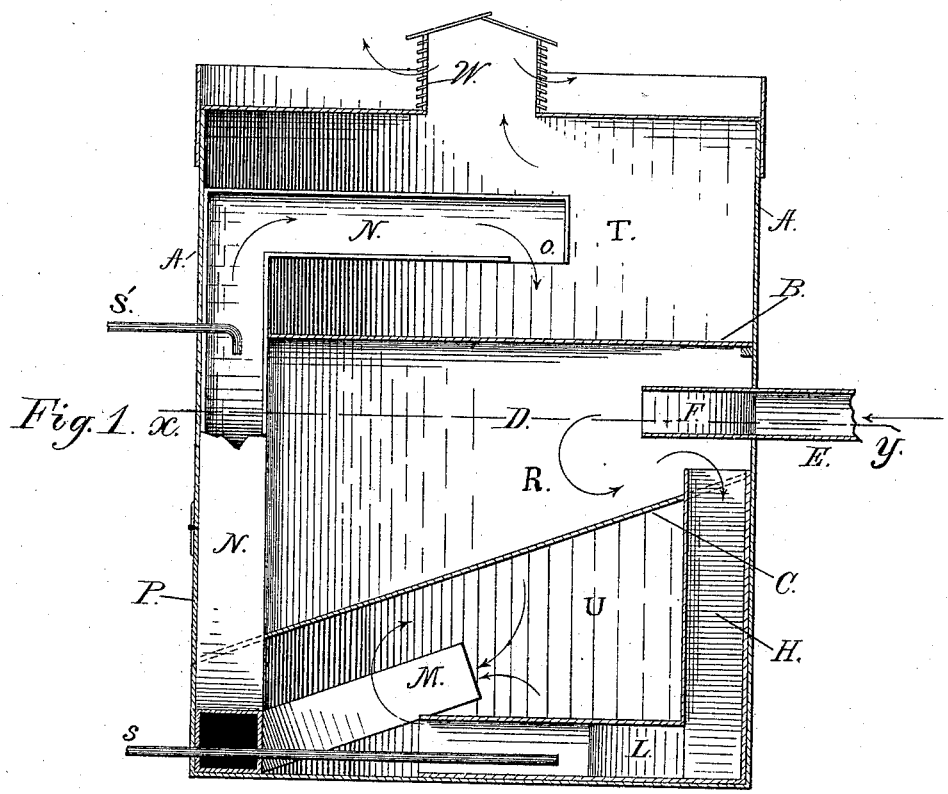
Fig. 1.
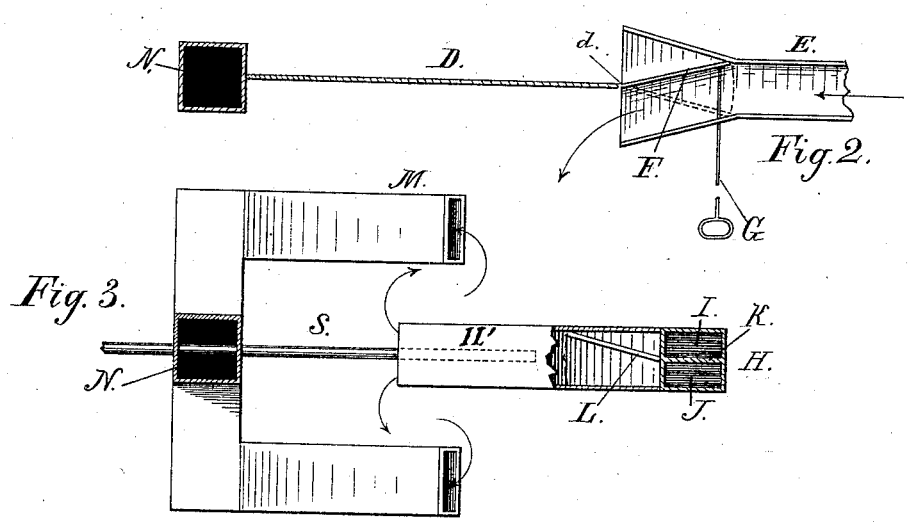
Fig. 2.
Fig. 3.
Witnesses,
H. Ogborn
William H. Ogborn
Inventor,
Oliver B. Rowlett

UNITED STATES PATENT OFFICE.

OLIVER B. ROWLETT, OF RICHMOND, INDIANA, ASSIGNOR OF ONE-HALF TO RHODA C. OGBORN, OF SAME PLACE.

DEVICE FOR PURIFYING AIR.

SPECIFICATION forming part of Letters Patent No. 283,724, dated August 21, 1883.

Application filed April 20, 1883. (No model.)

*To all whom it may concern:*

Be it known that I, OLIVER B. ROWLETT, a citizen of the United States, residing at Richmond, in the county of Wayne and State of Indiana, have invented certain new and useful Improvements in Devices for Purifying Air of Dust and in Precipitating, Depositing, and Saving the same; and I do hereby declare that the following is a full, clear, and exact description of the same, reference being had to the accompanying drawings, forming part of this specification, in which—

Figure 1 is a vertical section. Fig. 2 is a section through plane $x y$ in Fig. 1. Fig. 3 is a top view of the air and vapor pipes.

Like letters of reference indicate corresponding parts in the different figures.

The object of my invention is to purify the air and precipitate all particles of dust, and especially fine particles of precious metals, in dry-mining ore, reducing, purifying, and other mechanical processes, and in arresting and precipitating dust in shavings and dust rooms in factories of various kinds, and in precipitating and saving the nutritious dust in flouring-mills and preventing dust-explosions, and preventing dust being carried out of such mills by currents of air, causing great loss, and becoming, as dust, an intolerable nuisance, the particles being so light, impalpable, and numerous that all known processes and mechanical devices have failed to precipitate them and prevent their escape. These objects I accomplish cheaply, simply, rapidly, and thoroughly by my invention.

The drawings represent an apparatus or dust-room and connections, by means of which the principles of my improvements are carried into practical operation.

A A is the outside or inclosing wall of the dust-room; B, floor of upper dust-room; C, inclined floor of shavings-rooms; D, partition-wall dividing the two shavings-rooms; E, inlet-pipe for air, shavings, dust, &c.; F, valve in inlet-pipe; G, rod for operating valve F; H, spout connecting shavings-room with lower dust-room; I and J, double passages of the same; K, partition therein; L, valve therein; M M', branches of pipe N connecting lower and upper dust-rooms; O, outlet of pipe N; P, door to shavings-room; S, lower steam-pipe; S', upper steam-pipe; W, storm-shutters; $d$, pivot of valve F; R, right shavings-room; U, lower dust-room; T, upper dust-room.

Heretofore attempts have been made to purify the air and precipitate light particles of precious metals and nutritious particles in mills for their intrinsic value, and to prevent explosions, and to collect dust of wood, fibrous, and other substances, by the employment of various processes, all of which have partially or totally failed to precipitate the particles, purify the air, prevent explosions, and other loss and accidents. With my invention I purify the air, so that it may be returned to the mill or factory, if desired. I precipitate and eliminate the dust from the air for its intrinsic value, and for the purpose of purifying the air and preventing the dust being carried by the air after it has been blown into the shavings and dust room and scattered over the neighborhood and back into the factory or mill, where it occasions great loss of health and comfort and pecuniary damage by settling in the building and upon newly varnished and painted articles; and to this end my invention consists of the heretofore-described dust-arresting invention and the introduction, by any convenient means, of a sufficient quantity of vapor, exhaust-steam, or live steam into the dust-rooms of flouring-mills, ore-crushing mills, factories, and other establishments, where it is desired to settle the dust, of whatever composed, which at once arrests it in air-eddies and dampens it and largely increases its specific gravity and causes it to fall to the floor, thus purifying the air and precipitating the dust on the floor, from which it may be removed.

To carry my invention into effect where steam is not used as a motive power, I construct a simple apparatus capable of producing vapor of about the temperature of exhaust-steam, and connecting it by pipes with the dust-room by a stop-cock. Where steam is used for any purpose, I connect the dust-room, by suitable connections, directly to the exhaust-pipe of the engine, so that all the vapor or exhaust-steam needed to completely settle the dust can be turned into the dust-room, and turned off when not needed, by a suitable stop-cock.

It will be perceived that to settle dust and purify the air I turn the vapor or exhaust-steam into the dust-room, when the particles become dampened and fall to the floor. Simple vapor or exhaust-steam is preferable to live steam, as it takes time for the live steam to condense. The operations are alike, whether it is the object to purify the air or collect valuable particles, or when both objects are to be attained.

Some of the advantages of my invention are: the dust of precious metals and grain may be readily precipitated from the air and saved for their intrinsic value, and the air purified at the same time, and the dust from wood, fibrous, and other substances collected and burned, and the air be purified by bringing it in contact with vapor or exhaust-steam in a dust-room.

The operation is as follows: The fan being put in motion, the air comes into either the right or left shavings-room, accordingly as the valve F is drawn into the position shown in dotted lines, Fig. 2, or pushed into the position shown in Fig. 2, where we will suppose it to be in use. The volume of air from the fan comes laden with shavings, blocks, sawdust, and all kinds of dust and foreign particles, which are blown into room R with great force and violence, where an intense commotion is produced by the entrance of the air. The heavy particles are deposited on the inclined floor C, while the light dust is carried by the air-current over the top of the air-pipe H, and downward through it and into the lower dust-settling room, U; but as the dust is coming out of the lower end of air-pipe H it is met therein by a current of vapor or exhaust-steam issuing from pipe S, which instantly expands by coming in contact with the current of air, and the dust is dampened and its weight increased and most of it deposited on the floor of lower dust-room, U. The air then passes into the air-pipe M' and up and through the air-pipe N. In its passage it is met by another jet of vapor or exhaust-steam from pipe S', where it is further dampened, so that the remaining particles of dust are carried to dust-settling room T—the upper dust-room. After passing out of pipe N on its lower side, and being dampened the second time, and being now in a large dust-room, the precipitation of every particle of dust usually takes place; but should any particles still remain they are caught and retained by the burlap, or other soft, thick, fibrous material that is stretched over the storm-shutters, when the purified air escapes either back into the factory or into the open air, as may be desired.

When it is desired to empty the shavings-room on the right, the rod G is drawn forward and the valve thrown in the position shown in dotted lines in Fig. 2, when the self-adjusting valve L will be pushed to the opposite side of horizontal part of pipe H', Fig. 3, when the left shavings-room will commence to fill in the same manner just described as for the right side of the dust-room. The air now being entirely shut off from the right shavings-room, the door P to the right-hand room is opened and the deposit therein slips easily down the inclined floor C and falls on the pavement in front of the room, ready for use.

The operation of emptying the left-hand room is similar, except just the reverse. The dust-room may be emptied by shoveling the dust out or by any convenient means; but the fans should not be in operation while it is being done. The dust-room should be emptied at least every two weeks. The floating particles are thus instantly precipitated and the air purified by a process so simple, cheap, and thorough as to leave nothing more to be desired in the precipitation of dust and consequent purification of the air. The particles of moisture, when in the form of vapor or exhaust-steam, are so infinitely small and finely subdivided that they combine instantly with the particles of dust and precipitate the same, and thus purify the air.

Having thus fully described my invention and the application thereof, what I claim, and desire to secure by Letters Patent, is—

1. For purifying the air and saving the waste dust from manufactories operating upon wood, vegetable fiber, and like materials, the combination of an air-blast chamber provided with dust-receptacles, and an air and dust moistening device for introducing hot or warm vapor or exhaust-steam, substantially as herein set forth and described.

2. In a dust-settling, air-purifying, and waste-saving room for manufactories operating upon wood, vegetable fiber, and like materials, and in combination therewith, a jet of exhaust-steam, or its equivalent, and flues F H M N for the more perfect mixture of the dust and vapor, and consequent moistening and precipitating of the small particles of dust and saving thereof and purification of the air, substantially as set forth.

3. In an apparatus for purifying the air and saving the waste dust from factories operating upon wood, vegetable fiber, and like materials, the combination of pipes for conducting and guiding the incoming blast of dust-laden air, means, substantially as described, for introducing a blast of vapor or of exhaust-steam, a dust-settling room having receptacles, and means of controlling the direction and volume of the vapor or exhaust-steam, all for the purposes and in the manner substantially as set forth.

4. In a dust-settling and shavings room, the inlet-pipe E and valve F, in combination with valve-adjusting rod G and shavings-room R, having the inclined floor C, constructed and arranged together, for the purposes and in the manner substantially as herein set forth and described.

5. In a dust-settling and shavings room, the inlet-pipe E and valve F, having pivot $d$, in combination with the two shavings-rooms R R', inclined bottom C C', and outlet-pipe H, made, constructed, and operated together for the purposes and in the manner substantially as herein set forth and described.

6. In a dust-settling and shavings room, the inlet-pipe E, valve F, rod G, and pipe H, in combination with the valve L, pipe H', and dust-settling room U, constructed and used together for the purposes and in the manner substantially as herein set forth and described.

7. In a dust-settling and shavings room, the dust-room U, in combination with the inlet-pipe H, exhaust-steam pipe S, and outlet-flue N, with its opening O, constructed and operated for the purpose and in the manner substantially as herein set forth and described.

8. In a dust-settling room, the inlet-pipe E, valve F, and partition D, in combination with the shavings-rooms R R', dust-room U, and dust-room T, constructed substantially as described, and for the purposes herein set forth.

9. In a dust and shavings room, A A, the valve F, inlet-pipe E, air-pipes I J, and valve L, in combination with the pipe H', steam-pipe S, having one end outside of the dust-room and the inner end opening into the pipe H', whereby the exhaust-steam meets the incoming current of air in a close box, whereby it is thoroughly mixed together before entering the lower dust-room, all for the purposes herein set forth and described.

10. In a dust and shavings room, A A, composed of two dust-rooms and two shavings-rooms, the steam-pipes S S', in combination with the pipes H' and N, whereby the two currents of exhaust-steam are brought into direct contact with the dust-laden air for the purpose of more intimately uniting the hot moisture with the dust, and thereby moistening and precipitating the dust carried in the air, in the manner herein set forth and described.

11. In a dust-room, A A, the shavings-rooms R R', in combination with the pipes I J, valve L, pipes M M', pipe N, outlet O, and room T, and storm-protector W, constructed and operated for the purposes and in the manner herein set forth.

OLIVER B. ROWLETT.

Witnesses:
HARRISON OGBORN,
JAMES W. HENDERSON.